(12) United States Patent
Kao et al.

(10) Patent No.: US 8,296,820 B2
(45) Date of Patent: Oct. 23, 2012

(54) APPLYING SECURITY POLICIES TO MULTIPLE SYSTEMS AND CONTROLLING POLICY PROPAGATION

(75) Inventors: I-Lung Kao, Round Rock, TX (US); Daniel Paul Kolz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 736 days.

(21) Appl. No.: 12/016,395

(22) Filed: Jan. 18, 2008

(65) Prior Publication Data

US 2009/0187964 A1  Jul. 23, 2009

(51) Int. Cl.
  *G06F 17/00* (2006.01)
  *G06F 7/04* (2006.01)
  *G06F 15/16* (2006.01)
  *G06F 17/30* (2006.01)
  *G06F 7/00* (2006.01)
  *G06F 15/173* (2006.01)
  *H04L 29/06* (2006.01)

(52) U.S. Cl. ............ 726/1; 726/4; 726/6; 707/694; 707/786; 709/225; 709/229

(58) Field of Classification Search .............. 726/1
See application file for complete search history.

(56) References Cited

U.S. PATENT DOCUMENTS

| | | | | |
|---|---|---|---|---|
| 5,414,812 A * | 5/1995 | Filip et al. | ...... | 707/694 |
| 6,158,007 A * | 12/2000 | Moreh et al. | ...... | 726/1 |
| 6,158,010 A * | 12/2000 | Moriconi et al. | ...... | 726/1 |
| 6,189,036 B1 * | 2/2001 | Kao | ...... | 709/229 |
| 6,941,472 B2 * | 9/2005 | Moriconi et al. | ...... | 726/11 |
| 6,950,825 B2 * | 9/2005 | Chang et al. | ...... | 1/1 |
| 6,980,555 B2 * | 12/2005 | Mar | ...... | 370/395.21 |
| 7,003,578 B2 * | 2/2006 | Kanada et al. | ...... | 709/230 |
| 7,130,885 B2 * | 10/2006 | Chandra et al. | ...... | 709/206 |
| 7,150,037 B2 * | 12/2006 | Wolf et al. | ...... | 726/6 |
| 7,197,764 B2 * | 3/2007 | Cichowlas | ...... | 726/6 |
| 7,207,064 B2 * | 4/2007 | Fee et al. | ...... | 726/14 |
| 7,213,068 B1 * | 5/2007 | Kohli et a | ...... | 709/225 |
| 7,260,830 B2 * | 8/2007 | Sugimoto | ...... | 726/1 |
| 7,277,885 B2 * | 10/2007 | Eppley et al. | ...... | 1/1 |

(Continued)

FOREIGN PATENT DOCUMENTS

EP  1308823 A2 *  5/2003

OTHER PUBLICATIONS

Lang et al., "A Flexible, Model-Driven Security Framework for Distributed Systems," Proceedings of the IASTED International Conference, Dec. 10-12, 2003, New York, NY.

*Primary Examiner* — Carolyn B Kosowski
(74) *Attorney, Agent, or Firm* — Patterson & Sheridan LLP (57) ABSTRACT

Techniques are disclosed for attaching security policies to secured computing systems. A security policy is attached to a parent domain. The parent domain includes a first secured computing system. The security policy is a natural language description for controlling access to the secured computing system. Upon determining that the parent domain propagates the security policy, a first generation child domain is identified. The first generation child domain includes a second secured computing system. The first generation child domain is associated with the parent domain in a hierarchical relationship. It is determined that the first generation child domain inherits the security policy based on an inheritance rule. The security policy is attached to the first generation child domain.

21 Claims, 10 Drawing Sheets

U.S. PATENT DOCUMENTS

| | | | |
|---|---|---|---|
| 7,318,237 B2 * | 1/2008 | Moriconi et al. | 726/27 |
| 7,350,226 B2 * | 3/2008 | Moriconi et al. | 726/1 |
| 7,370,050 B2 * | 5/2008 | Hunter et al. | 1/1 |
| 7,398,284 B2 * | 7/2008 | Sterling et al. | 707/694 |
| 7,546,633 B2 * | 6/2009 | Garg et al. | 726/4 |
| 7,591,000 B2 * | 9/2009 | Griffin et al. | 726/1 |
| 7,644,432 B2 * | 1/2010 | Patrick et al. | 726/1 |
| 7,653,930 B2 * | 1/2010 | Griffin et al. | 726/1 |
| 7,779,265 B2 * | 8/2010 | Dubhashi et al. | 713/182 |
| 7,823,206 B2 * | 10/2010 | Sugimoto | 726/25 |
| 7,917,940 B2 * | 3/2011 | Holdsworth et al. | 726/2 |
| 8,078,707 B1 * | 12/2011 | Watsen et al. | 709/223 |
| 2003/0188198 A1 * | 10/2003 | Holdsworth et al. | 713/201 |
| 2005/0008001 A1 * | 1/2005 | Williams et al. | 370/352 |
| 2007/0136301 A1 * | 6/2007 | Jardin | 707/10 |
| 2007/0136603 A1 * | 6/2007 | Kuecuekyan | 713/185 |
| 2007/0255769 A1 * | 11/2007 | Agrawal et al. | 707/205 |
| 2008/0052203 A1 * | 2/2008 | Beyer et al. | 705/28 |
| 2009/0031026 A1 * | 1/2009 | Tanner et al. | 709/226 |
| 2009/0144804 A1 * | 6/2009 | Idicula et al. | 726/2 |
| 2012/0023546 A1 * | 1/2012 | Kartha et al. | 726/1 |

* cited by examiner

| DOMAIN ID | DOMAIN PARENT | INHERITANCE CODE | SYSTEMS |
|---|---|---|---|
| A | X | X | Q, Z, X |
| B | A | B | F, K |
| C | A | – | H, L, T, V |
| D | B | – | R, S |
| E | B | – | U, W |
| F | B | N | G, M, N, O |

FIG. 3A

| DOMAIN ID | POLICIES |
|---|---|
| A | POLICY D, POLICY G |
| B | POLICY Z1 |
| C | POLICY Z1, POLICY Z3, POLICY G, POLICY D |

FIG. 3B

| POLICY ID | PROPAGATION FLAG |
|---|---|
| D | Y |
| G | N |
| Z1 | Y |
| Z3 | Y |

APPLYING SECURITY POLICIES TO MULTIPLE SYSTEMS AND CONTROLLING POLICY PROPAGATION

BACKGROUND OF THE INVENTION

The field of the invention relates to secured computing systems, specifically to applying security policies to multiple systems and controlling policy propagation.

DESCRIPTION OF THE RELATED ART

A secured system manages or controls computing resources and has capabilities to enforce policies for those resources. Examples of secured systems include a desktop computer, an operating system, a database management system, a web server, network firewalls, and intrusion detection systems. Essentially, any special-purpose security hardware or software where security policies can be defined to regulate their operations to meet specific security requirements is a secured system.

Any organization that uses computing technologies may have multiple secured systems for which different security policies need to be applied. For example, the computer science department at a university may restrict access to programming software to students and faculty of the computer science department. Accordingly, an access control policy needs to be defined and applied to the systems that manage the programming software. Further, there may be instances where the same policies need to be applied to different systems. For example, the same university may restrict access to computers across all campuses via password authentication. Accordingly, a security policy for password authentication may be defined and applied to many different systems throughout the campus.

SUMMARY OF THE INVENTION

The present invention generally provides a method and apparatus for attaching security policies to secured computing systems is provided. A security policy is attached to a parent domain. The parent domain includes a first secured computing system. The security policy is a natural language description for controlling access to the secured computing system. Upon determining that the parent domain propagates the security policy, a first generation child domain is identified. The first generation child domain includes a second secured computing system. The first generation child domain is associated with the parent domain in a hierarchical relationship. It is determined that the first generation child domain inherits the security policy based on an inheritance rule. The security policy is attached to the first generation child domain.

According to one embodiment, a computer readable medium contains a program which, when executed, performs an operation. A security policy is attached to a parent domain. The parent domain includes a first secured computing system. The security policy is a natural language description for controlling access to the secured computing system. Upon determining that the parent domain propagates the security policy, a first generation child domain is identified. The first generation child domain includes a second secured computing system. The first generation child domain is associated with the parent domain in a hierarchical relationship. It is determined that the first generation child domain inherits the security policy based on an inheritance rule. The security policy is attached to the first generation child domain.

According to one embodiment, a system comprises a processor and a memory. The memory contains a program executed by the processor. A security policy is attached to a parent domain. The parent domain includes a first secured computing system. The security policy is a natural language description for controlling access to the secured computing system. Upon determining that the parent domain propagates the security policy, a first generation child domain is identified. The first generation child domain includes a second secured computing system. The first generation child domain is associated with the parent domain in a hierarchical relationship. It is determined that the first generation child domain inherits the security policy based on an inheritance rule. The security policy is attached to the first generation child domain.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the present invention generally provide a method and apparatus for applying security policies to systems organized in a domain hierarchy. Embodiments further provide a method and apparatus for controlling security policy propagation within the domain hierarchy. In one embodiment, an administrative user defines a security policy as a business-level/natural language statement. The security policy definition includes a specification as to whether the security policy is propagated, or isolated to individual domains. The security policy is attached to a domain, and propagated down the domain hierarchy based on whether child domains inherit security policies.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1A:
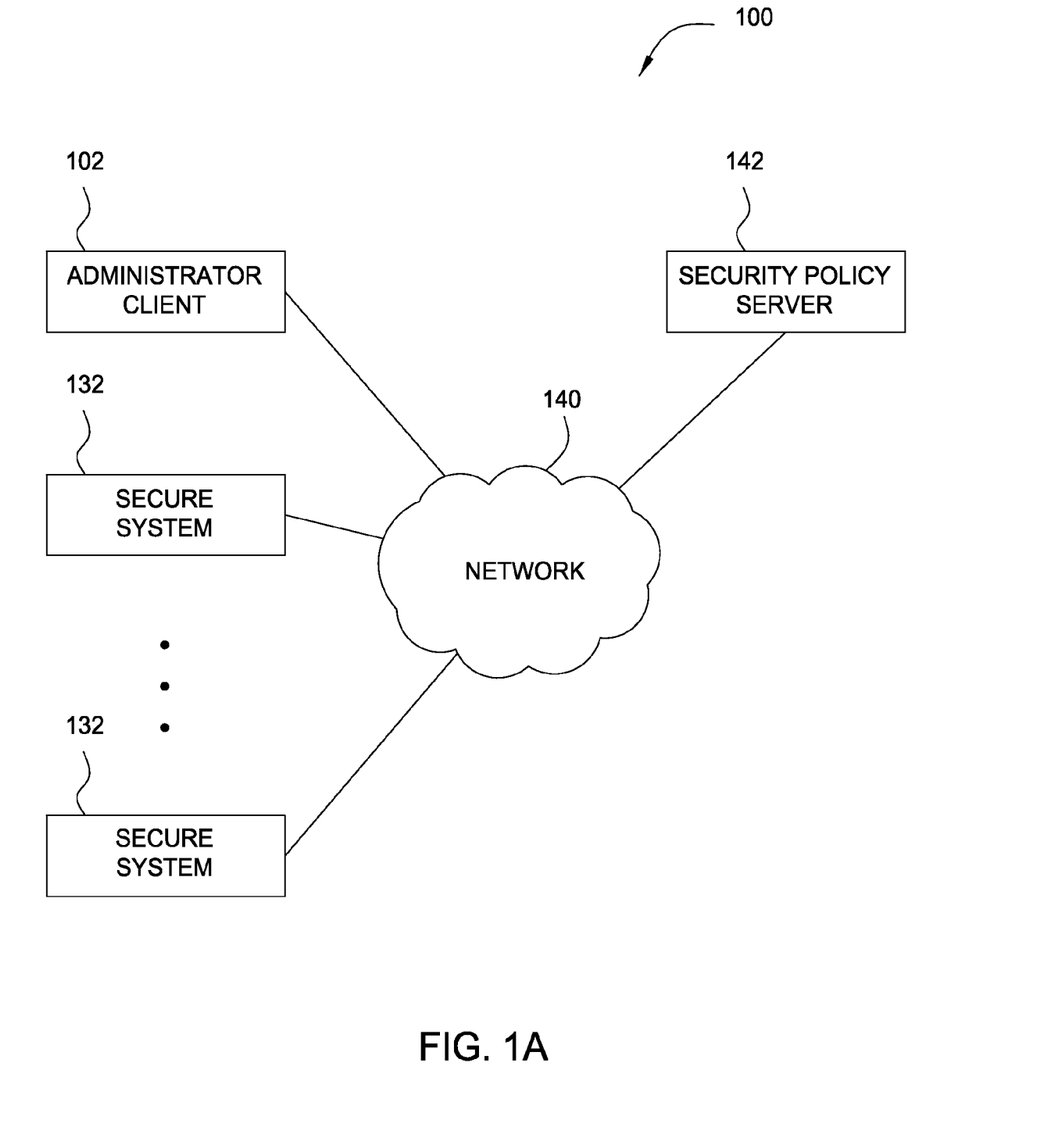
FIG. 1A is a block diagram illustrating a system for applying security policies to multiple systems and controlling policy propagation, according to one embodiment of the invention.

FIG. 1A is a block diagram illustrating a system 100 for applying security policies to multiple systems and controlling policy propagation, according to one embodiment of the invention. In general, the networked system 100 includes an administrator client (e.g., user's) computer 102, numerous secured systems 132, and a security policy server 142. The client 102, secured systems 132, and security policy server 142 are connected via a network 140. In general, the network 140 may be a telecommunications network and/or a wide area network (WAN). In a particular embodiment, the network 140 is the Internet.

In a system for applying security policies to multiple systems and controlling policy propagation, an administrator client 102 may interface with a security policy server 142 to create and maintain natural language-like security policies for secured systems 132. Natural language-like security policies may be business level statements that can be translated into enforceable security policies for secured systems 132. For example, a business-level statement for a security policy may be, "Restrict access to physicians." In turn, the secure system 132 may translate the business level statement into CPU-executable code for restricting access to the secured system to physicians based on a sign-on identifier.

Further, the administrator user may 'attach' security policies to specific secure systems 132. In other words, the administrator client may interface with the security policy server 142 to further identify the particular secure systems 132 to which a security policy applies.

In some embodiments, a secure system 132 is the most basic entity that a security policy can be applied to. In one embodiment, a secure system 132 manages or controls resources and has the capability to enforce security policies for those resources. A secure system 132 may be a software system, such as a DB2® database management system (DBMS), a Websphere® web server, or a firewall. (DB2® and Websphere® are registered trademarks belonging to International Business Machines, Inc., of Armonk, N.Y.) A secure system 132 may also be a hardware system, such as a network of desktop computers, or even a hard drive on a computer.

In one embodiment, the administrator client 102 may interface with the security policy server 142 to organize secured systems 132 into domains. A domain may be one or more related secure systems 132, whereby security policies can be applied to multiple related systems 132 by attaching the policies to a single domain. The secure systems 132 may interface with the security policy server 142 to determine the applicable security policies, and in turn, enforce those policies.

Figure 1B:
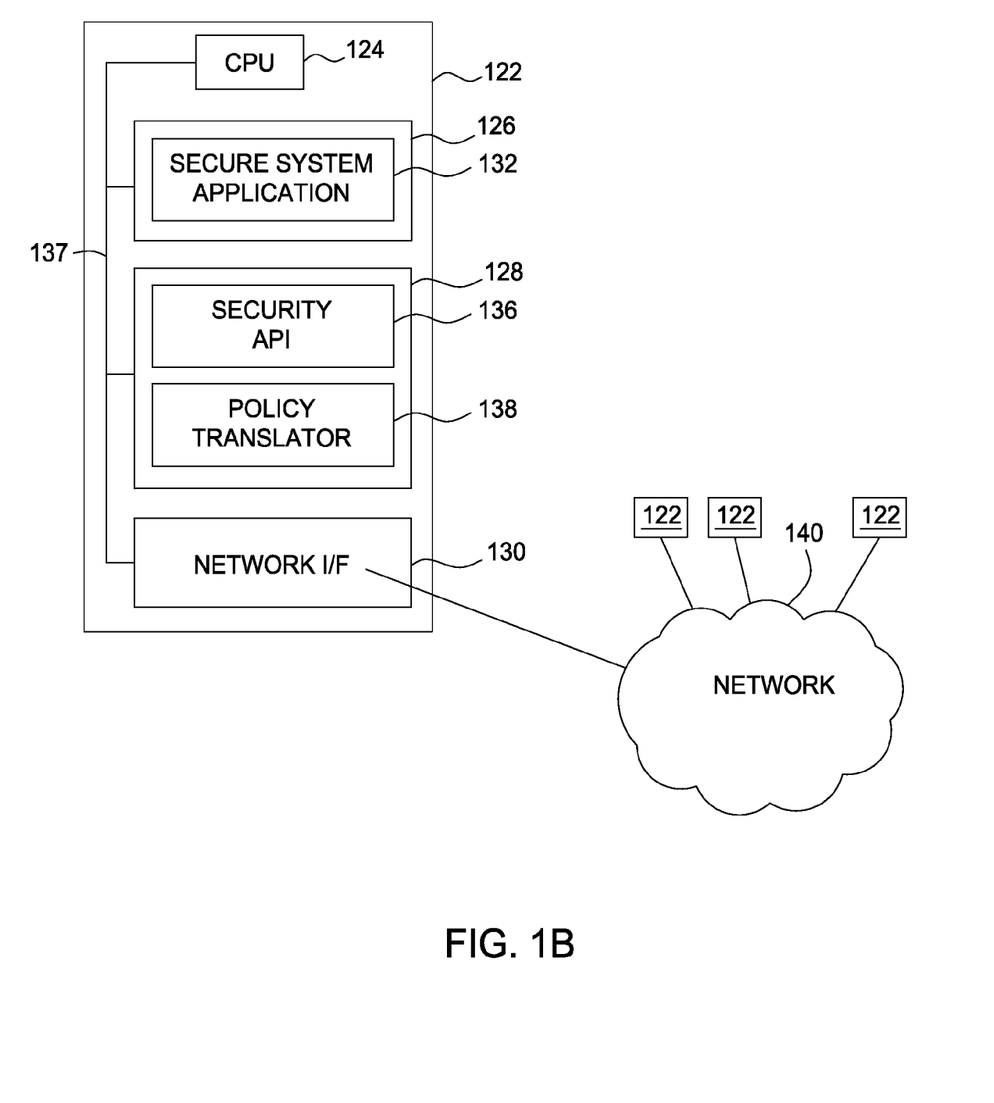
FIG. 1B is a block diagram illustrating a secure system computer, according to one embodiment of the invention.

FIG. 1B is a block diagram illustrating a secure system computer 122, according to one embodiment of the invention. The secure system computer 122 generally comprises a Central Processing Unit (CPU) 124, a memory 126, a storage 128, and a network interface device 130, coupled to one another by a bus 137. The CPU 124 could be any processor used to perform an embodiment of the invention.

The memory 126 may be a random access memory sufficiently large to hold the necessary programming and data structures that are located on the secure system computer 122. The programming and data structures may be accessed and executed by the CPU 124 as needed during operation. While the memory 126 is shown as a single entity, it should be understood that the memory 126 may in fact comprise a plurality of modules, and that the memory 126 may exist at multiple levels, from high speed registers and caches to lower speed but larger DRAM chips.

Storage 128 may be a Direct Access Storage Device (DASD). Although it is shown as a single unit, it could be a combination of fixed and/or removable storage devices, such as fixed disc drives, floppy disc drives, tape drives, removable memory cards, or optical storage. The memory 126 and storage 128 could be part of one virtual address space spanning multiple primary and secondary storage devices.

The network interface device 130 may be any entry/exit device configured to allow network communications between the administrator client 102, the secured system computer 122, and the security policy server 142 via the network 140. For example, the network interface device 130 may be a network adapter or other network interface card (NIC).

The memory 126 may also include a secure system 132, where the secure system 132 is a software system, as described in FIG. 1A. The storage 128 may include a policy translator 138. In one embodiment, the policy translator 138 determines which security policies are attached to the secure system 132, and translates the business-level statements into machine code executable by the CPU 124. The storage 128 also includes a security application program interface (API) 136. The secure system 132 may enforce security policies attached to system 132 by executing the translated machine code through calls to the security API 136.

In one embodiment, the secure system 132 may be a component of an operating system which may control access to the secure system computer 122 itself, or any component hardware, such as the network interface 130 or the storage 128. Examples of operating systems include UNIX, versions of the Microsoft Windows® operating system, and distributions of the Linux® operating system. (Note: Linux is a trademark of Linus Torvalds in the United States and other countries.) More generally, any operating system supporting the functions disclosed herein may be used.

Figure 1C:
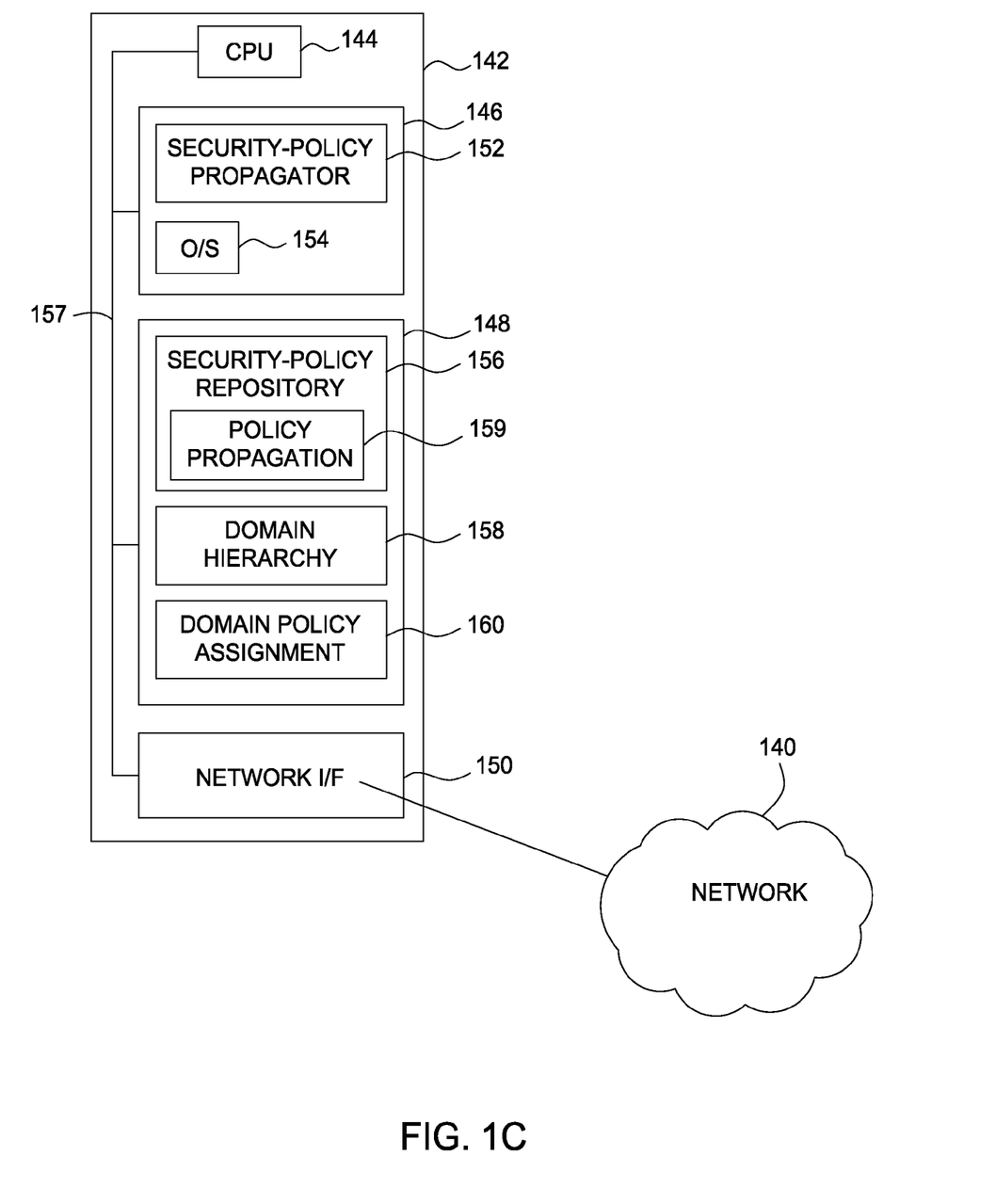
FIG. 1C is a block diagram illustrating a security policy server, according to one embodiment of the invention.

FIG. 1C is a block diagram illustrating a security policy server 142, according to one embodiment of the invention. The security policy server 142 may be similarly constructed as the secured system computer 122, with the server 142 having a Central Processing Unit (CPU) 144 connected via a bus 157 to a memory 146, storage 148, and a network interface (I/F) device 150.

The memory 146 includes a security-policy propagator 152. According to one embodiment, the security policy propagator 152 attaches a security policy to a domain within a domain hierarchy table 158 (shown in the storage 148, and described in more detail below), and propagates the policy to children domains based on the rules specified in the domain hierarchy table 158. Further, the security policy propagator 152 may record the domain policy attachments in the domain policy assignment 160.

The storage 148 includes the security policy repository 156, domain hierarchy table 158, and domain policy assignment 160. The security policy repository 156 may be a data structure that contains the natural language/business level statement security policies. In some embodiments, the security policies may be stored in an intermediate format, between natural language and machine-code executable statements. According to one embodiment, the application 114 translates the natural language/business level statement security policies into extensible markup language (XML), and stores the security policies as XML in the repository 156.

Additionally, the security policy repository 156 contains the policy propagation table 159. The policy propagation table 159 specifies whether, for each policy, when the policy is attached to a domain, the security policy is propagated to the child domains of the attached domain.

Figure 3A:
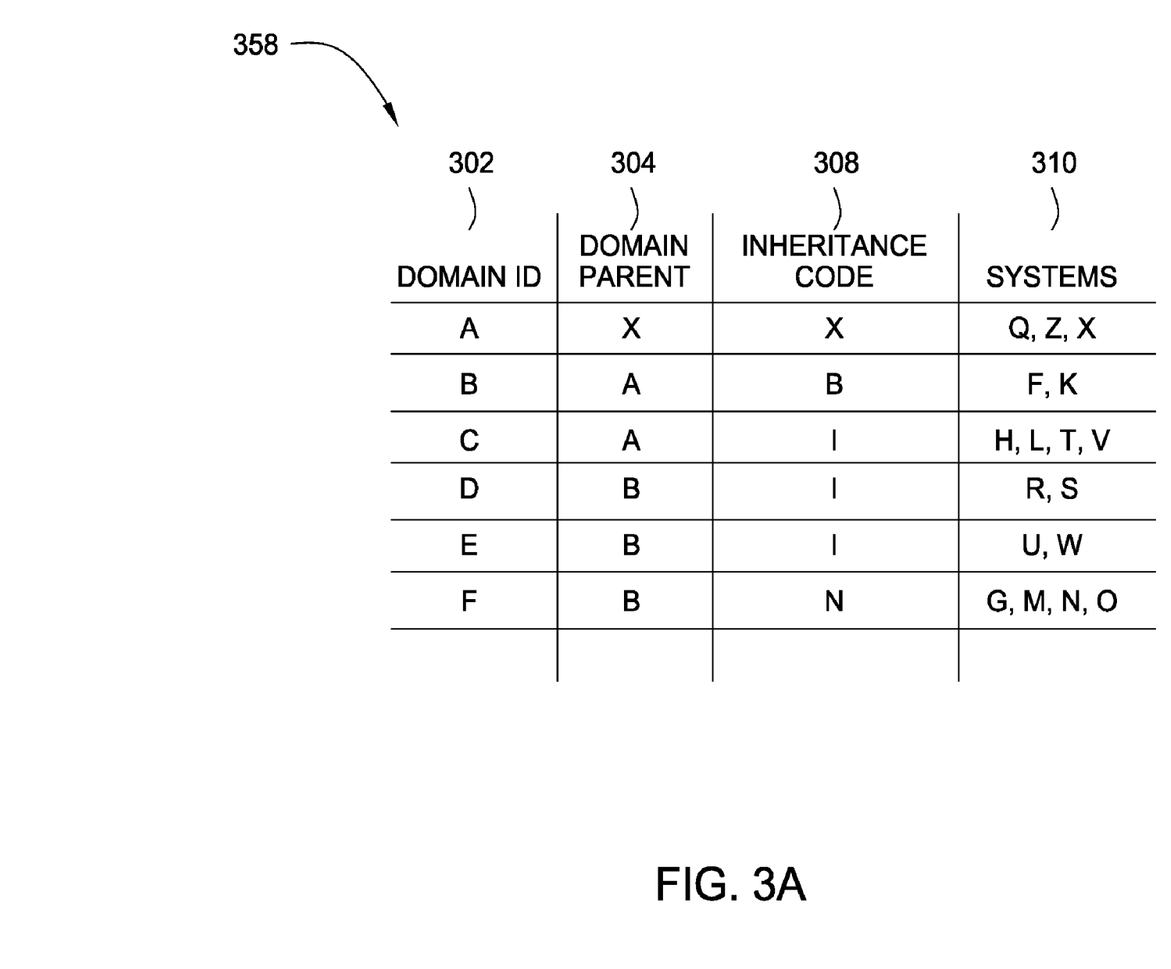
FIG. 3A illustrates a domain hierarchy table for the domain hierarchy illustrated in FIG. 2, according to one embodiment of the invention.

The domain hierarchy table 158 may be a data structure that specifies the systems 132 within each domain, and relationships between domains. In one embodiment, the relationships between domains are specified according to a tree hierarchy structure such that attaching a security policy to one domain, in turn, propagates the same policy to related domains down the domain hierarchy table 158. An embodiment of the domain hierarchy table 158 is described in further detail in the description for FIG. 3. According to one embodiment, the domain hierarchy table 158 may reflect business organization hierarchy, or department-specific hierarchy for an organization.

Further, the domain hierarchy table 158 may specify rules for security policy propagation. For example, where a security policy is attached to a domain, all children domains of that domain may inherit the same policy according to rules specified for each domain. One rule may specify that the domain with the security policy attached does not propagate the policy to child domains. Other rules may be specified at the child domain level. For example, one rule may specify that a child domain does not inherit security policies propagated by a 'parent' domain. Another rule (i.e., a "generation skipping" rule) may specify that the child domain does not inherit a propagated security policy, but the children of the child, i.e. the grandchildren domains, do inherit the policy.

The domain policy assignment 160 may be a data structure that specifies the security policies that are attached to each domain in the domain hierarchy. According to one embodiment, the secure system 132 interfaces with the domain policy assignment 160 to determine which policies are attached to the secure system 132.

The security policy server 142 is generally under the control of an operating system 154, which is shown in the memory 146. Any operating 154 system supporting the functions disclosed herein may be used.

Figure 1D:
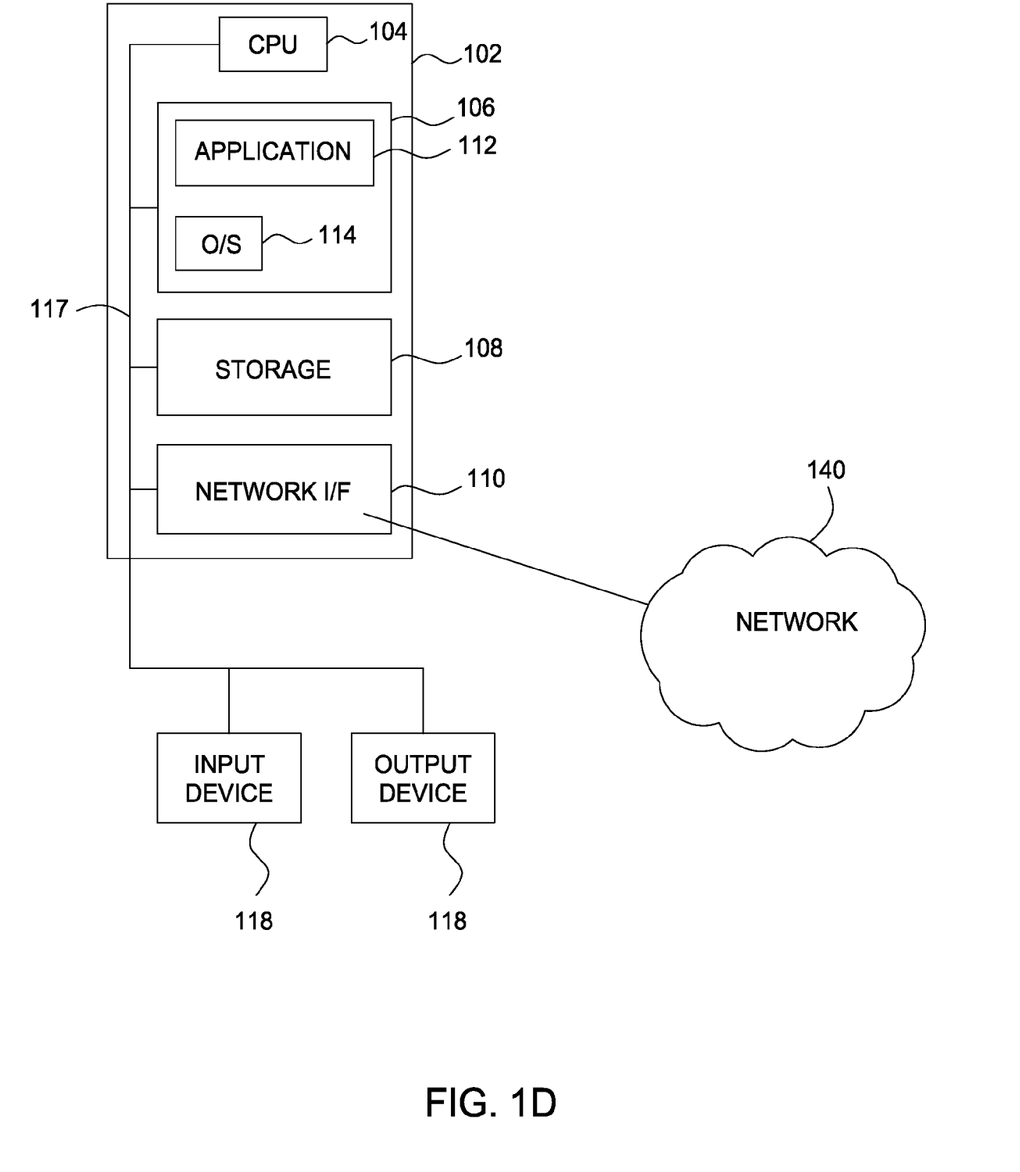
FIG. 1D is a block diagram illustrating an administrator client computer, according to one embodiment of the invention.

FIG. 1D is a block diagram illustrating an administrator client computer 102, according to one embodiment of the invention. The administrator client computer 102 may be similarly constructed as the secured system computer 122, with the client 102 having a Central Processing Unit (CPU) 104 connected via a bus 117 to a memory 106, storage 108, and a network interface (I/F) device 110. Further, the client 102 may also be connected via a bus 117 to an input device 118 and an output device 119.

The memory 106 includes an application 112. The application 112 may provide graphical user interfaces (GUIs) to the administrator user for defining business-level security policies, organizing secured systems into domains, organizing the domain hierarchy table 158, and specifying the rules by which security policies are propagated down the domain hierarchy table 158.

The administrator client computer 102 is generally under the control of an operating system 114, which is shown in the memory 106. Any operating 114 system supporting the functions disclosed herein may be used.

The input device 118 can be any device to give input to the application server 102. For example, a keyboard, keypad, light pen, touch-screen, track-ball, or speech recognition unit, audio/video player, and the like could be used.

The output device 119 can be any device to give output to the user or an audience for an advertisement, e.g., any conventional display screen or set of speakers, along with their respective interface cards, i.e., video cards and sound cards (not shown). Although shown separately from the input device 118, the output device 119 and input device 118 could be combined. For example, a display screen with an integrated touch-screen, a display with an integrated keyboard, or a speech recognition unit combined with a text speech converter could be used.

Figure 2:
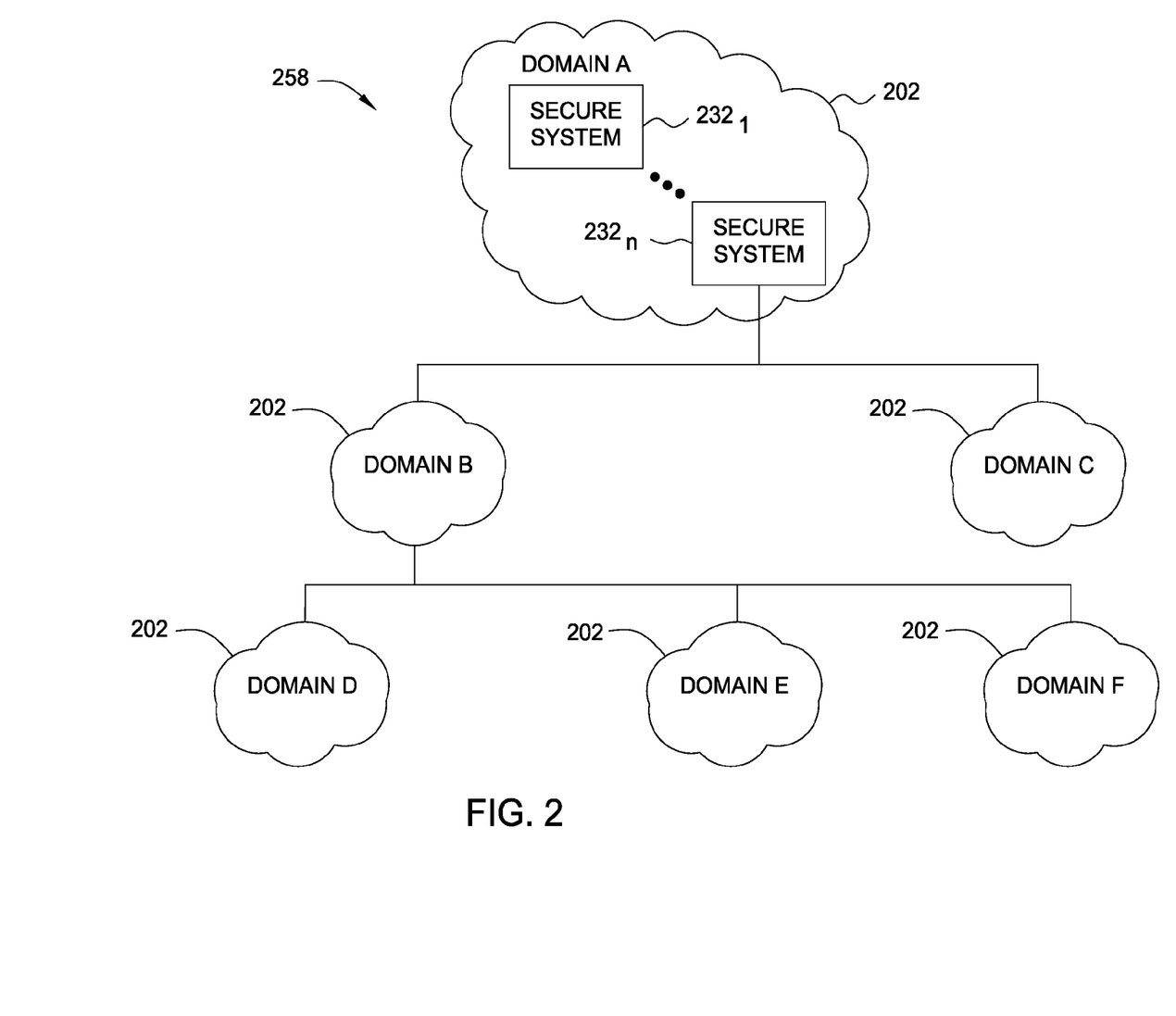
FIG. 2 is a diagram illustrating a domain hierarchy, according to one embodiment of the invention.

FIG. 2 is a diagram illustrating a domain hierarchy 258, according to one embodiment of the invention. The domain hierarchy 258 includes six domains 202, "DOMAIN A-F." As shown, the DOMAIN A includes multiple secure systems $232_{1-n}$. In one embodiment, the secure systems 232 within one domain 202 are related such that the same security policies may be enforced by all systems 232 within the domain 202. Similarly, each of DOMAINs B-F also include one or more secure systems 232.

Further, as shown, domains 202 may be further organized within a tree-like hierarchical structure with parent and child-domain relationships. For example, DOMAIN A has two child domains, DOMAINs B and C. Similarly, DOMAIN B has three child domains, DOMAINs D, E, and F.

According to one embodiment, the administrator user may attach a security policy to DOMAIN A, using application 112. If a DOMAIN A rule specifies that security policies are propagated, the security policy propagator 152 may propagate the security policy to child DOMAINs B and C. In turn, if a DOMAIN B rule specifies that security policies are propagated, the security policy propagator 152 may propagate the security policy to child DOMAINs D, E, and F.

In a case where the security policy is a password policy, e.g. passwords require changing every three months, attaching the password security policy at the top level of the hierarchy 258 may be desirable because all the secured systems 232 in DOMAINs A-F may use password authentication. However, for a security policy that does not affect all domains 202, security policy propagation may be controlled by attaching the security policy at a lower level in the domain hierarchy 258, and only the domains and its child domains will inherit that security policy.

For example, DOMAINs A and C may include secured firewall systems 232. Further, DOMAINs B, D, E, and F may each include different categories of secured database systems 232. In such a case, a database security policy may be incompatible with firewall systems, and therefore cannot be applied to firewall systems. Accordingly, the administrator may attach a database security policy to DOMAIN B. If security policies at DOMAIN B are propagated by rule, the security policy propagator 152 may propagate the security policy to child DOMAINs D, E, and F. In such a case, the security policy is not attached to DOMAINs A nor C.

According to one embodiment, the security policy propagator 152 determines which domains to propagate a security policy to by referring to a domain hierarchy table. FIG. 3 illustrates an embodiment of such a domain hierarchy table.

FIG. 3A illustrates a domain hierarchy table 358 for domain hierarchy 258, according to one embodiment of the invention. The domain hierarchy table 358 includes a domain ID column 302, a domain parent column 304, an inheritance rule column 308, and a systems column 310.

The domain ID column 302 may contain a unique identifier (domain ID) for each domain 202 within a domain hierarchy 258. The domain parent column 304 may specify the domain id of a child domain's parent. The inheritance rule (contained in the inheritance rule column 308) may specify the rule regarding inheritance of a security policy, i.e., whether security policies propagated from the parent domain are inherited, not inherited, and/or bypassed. The systems column 310 may contain values identifying all the secure systems 232 included in the domain.

The first row of table 358 identifies DOMAIN A in the domain ID column 302. As shown in the hierarchy 258 described in FIG. 2, DOMAIN A has no parent. Embodiments of the invention may identify a domain 202 that has no parent with a blank value in column 304, or some other such indicator. In the present example, the corresponding entry in the domain parent column 304 is an "X."

The inheritance rule 308 is an "X," which may represent a default value for domains without parents, such as DOMAIN A. Again, other values such as a blank, or "N/A" may also be used for domains without parents. Alternate values for the inheritance rule may include, "I" for "Inherit," "B" for "Bypass," or "N" for "Does Not Inherit." According to one embodiment of the invention, a child domain may specify whether security policies are inherited from a parent domain by specifying an "I" or "N" value in the inheritance rule column 308. It should be noted that domain A may later become a child domain in another domain hierarchy. Accordingly, the "X" value may later change to either the "I" or "B" value.

Alternately, the child domain bypass inheritance (the 'generation skipping' rule described in FIG. 1A). In other words, the child domain does not inherit security policies from the parent. Rather, the children of the child domain inherit from their 'grandparent' domain. For example, in the second row of table 358 (for domain "B") the inheritance rule column value is "B." In such a case, when a security policy is attached to domain A (described in FIG. 2), domain B does not inherit the security policy. However, the children of domain B (domains D, E, and F) do inherit the security policy because the inheritance rule indicates that security policies bypass domain "B." Rows two through six of domain hierarchy table 358 include similar values.

It should be noted that the table 358 merely represents one possible embodiment of a data structure representing the domain hierarchy and inheritance attributes associated with each domain.

Figure 3B:
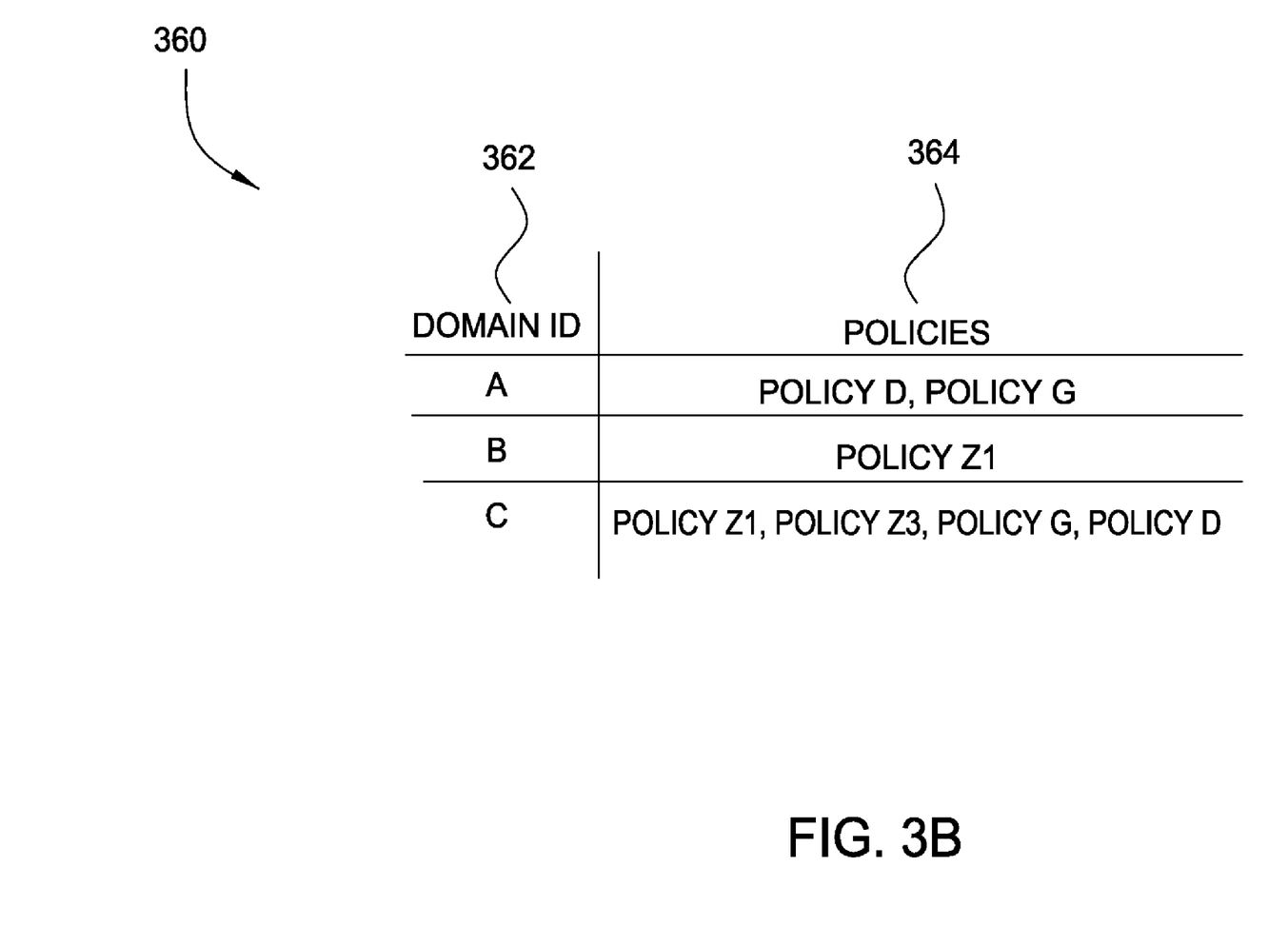
FIG. 3B illustrates a domain policy assignment table, according to one embodiment of the invention.

FIG. 3B illustrates a domain policy assignment table 360, according to one embodiment of the invention. As security policies are attached, and propagated within the domain hierarchy 258, the security policy propagator 152 may store data about which security policies are attached to which domains 202. Domain policy assignment table 360 includes domain ID column 362, and policies column 364. The domain ID column 362 may contain a unique identifier for each domain 202 within a domain hierarchy 258. The policies column 364 may contain values identifying the security policies within the security policy repository 156 that are attached to the domain specified in the ID column 362. For example, the first row of table 360 may specify that policies "P" and "G" are attached to DOMAIN A. "P" and "G" may be unique identifiers for business level security statements stored in the repository 156. Rows two and three include similar values.

Figure 4:
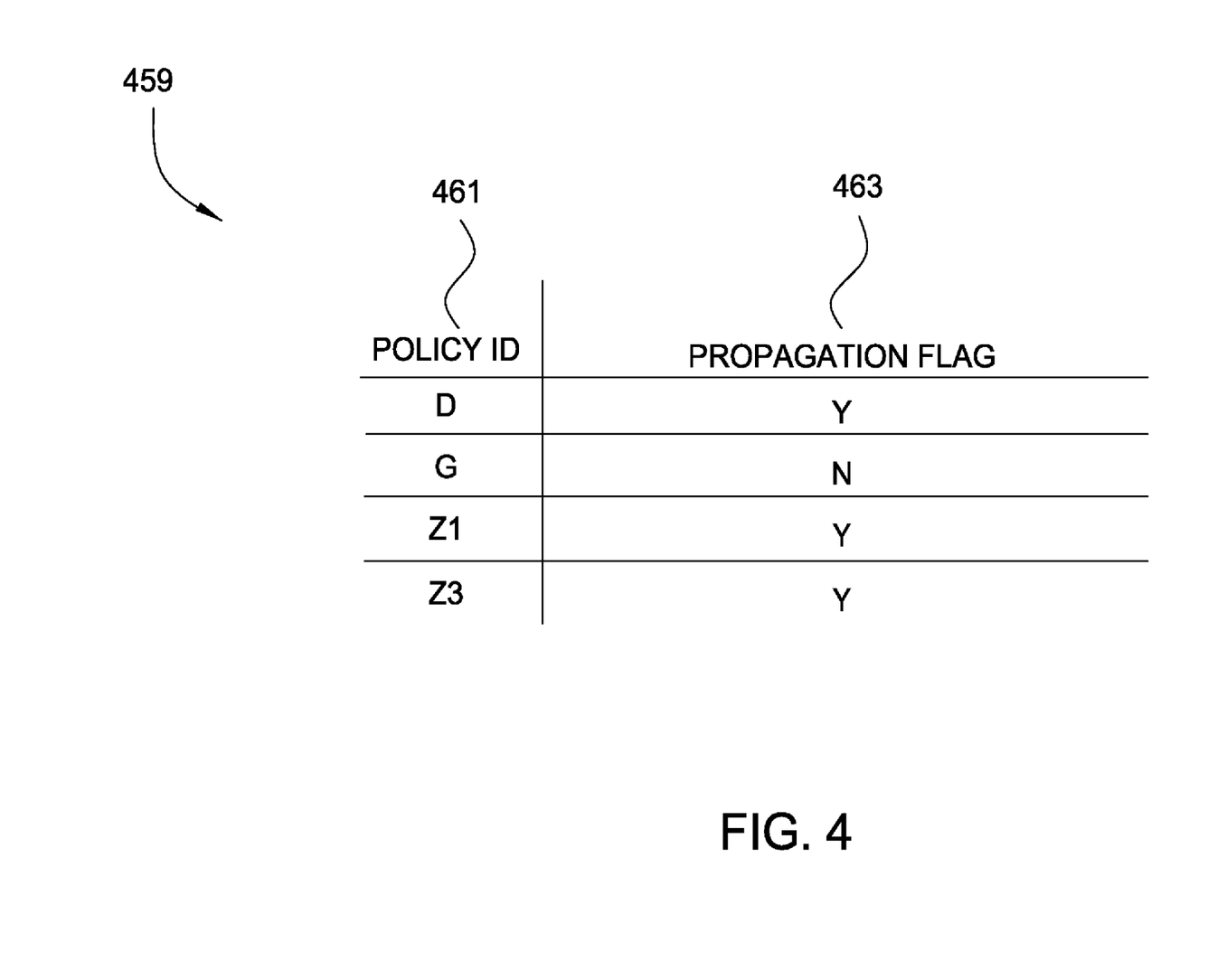
FIG. 4 illustrates a security policy repository table, according to one embodiment of the invention.

Security policy inheritance rules as described above are implicated whenever a security policy is to be propagated. However, not all security policies are propagated. FIG. 4 illustrates a security policy propagation table 459, according to one embodiment of the invention. The security policy propagation table 459 includes a policy ID column 461, and a propagation flag column 463. The policy ID column 461 identifies the security policies stored in the repository 156 with a unique identifier. The propagation flag column 463 specifies whether or not the security policy is propagated to children domains of a domain to which the security policy is attached. The propagation flag may be "Y" indicating that a security policy is propagated to child domains or "N" indicating that a security policy is not propagated to child domains (i.e., attached to the current domain only). The first row of the security policy propagation table 459 contains a "D" value in the Policy ID column 461, and a "Y" value in the propagation flag column 463. Accordingly, when security policy "D" is attached to a domain in the domain hierarchy 258, the security policy propagator 152 propagates security policy "D" to the child domains of the domain to which security policy "D" is attached.

Row two for policy G contains an "N" propagation flag. The "N" value indicates that when policy G is attached to a domain, policy G only applies to the secure systems within the attached domain, but policy G will not be propagated to any child domains. Rows three and four contain similar values.

Figure 5A:
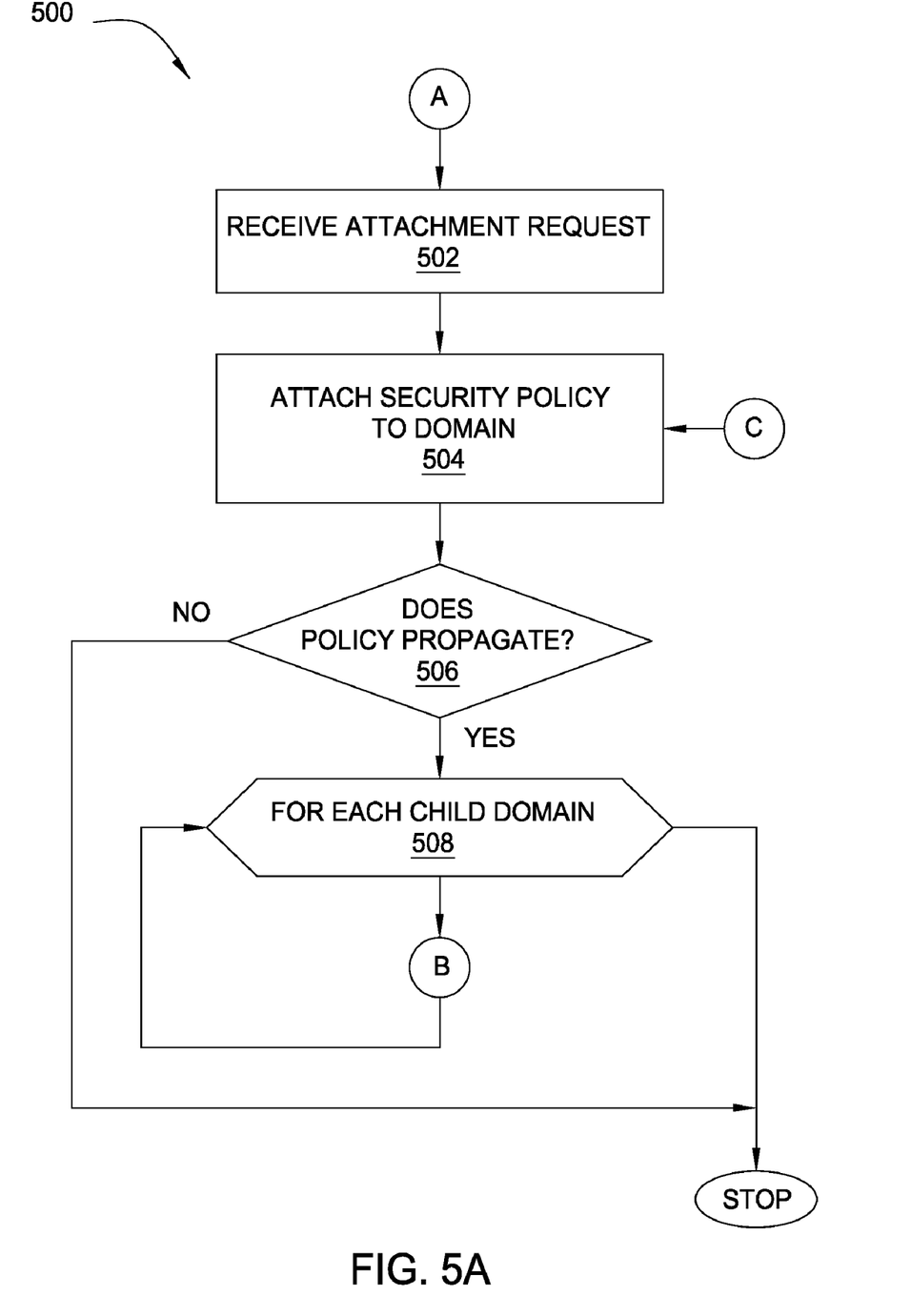
FIG. 5A is a flowchart illustrating a process for attaching a security policy to a domain, according to one embodiment of the invention.

FIG. 5A is a flowchart illustrating a process 500 for attaching a security policy to a domain, according to one embodiment of the invention. Process 500 begins at step 502, where the security policy propagator 152 may receive a security policy attachment request from the administrator client 102. The attachment request may include identifiers of the domain and security policy, described in FIG. 4. According to one embodiment, the attachment request may also specify whether the security policy is propagated to children of the attaching domain.

At step 504, the security policy propagator 152 may attach the security policy to the domain specified in the attachment request. The propagator 152 may update the domain policy assignment table 460 to reflect the security policy attachment.

At step 506, the propagator 152 may determine whether security policies attached at this domain propagate to child domains, based on the attachment request. If the security policy does not propagate, process 500 may end.

If the security policy does propagate to child domains, the security policy propagator 152 is invoked, and a loop begins at step 508 for each child of the attaching domain. The steps of the loop are described in detail in the description for FIG. 5B.

Figure 5B:
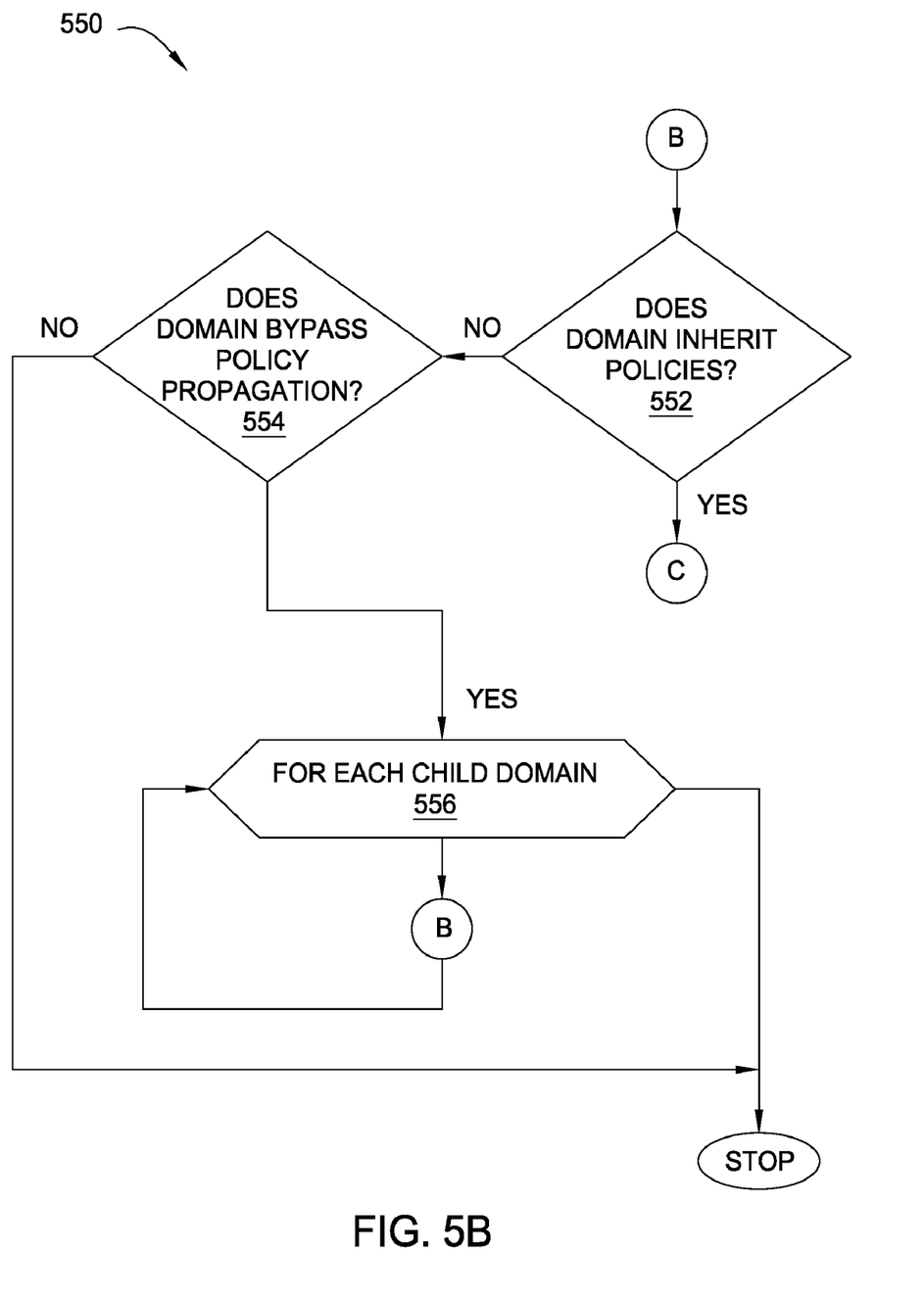
FIG. 5B is a flowchart describing a process for controlling security policy propagation, according to one embodiment of the invention.

FIG. 5B is a flowchart describing a process 550 (entered at step 508 of FIG. 5A) for controlling security policy propagation, according to one embodiment of the invention. At step 552, the propagator 152 may determine whether the child domain inherits security policies from the parent domain based on the inheritance rule 308 described in FIG. 3. If the inheritance rule 308 is "I," indicating that policies are inherited, process 500 described in FIG. 5A is repeated for the child domain. If not, at step 554, the propagator 152 determines whether the security policy bypasses the child domain, and is instead inherited at the next level of child domains. If not, the process 550 ends.

If the inheritance rule 308 is "B," indicating a bypass rule, the propagator 152 begins a loop at step 556. As shown, process 550 may be repeated for each child domain.

Together, the FIGS. 5A and 5B flowcharts illustrate a single process for applying a security policy to multiple domains that are organized in a hierarchy, and controlling security policy propagation within the hierarchy.

While the foregoing is directed to embodiments of the present invention, other and further embodiments of the invention may be devised without departing from the basic scope thereof, and the scope thereof is determined by the claims that follow.

What is claimed is:

1. A computer-implemented method to manage security policy propagation between a plurality of domains of secured computing systems and based on a policy-specific propagation flag and a domain-specific inheritance rule, the method comprising:

applying a security policy to a parent domain that includes a first secured computing system, wherein the security policy specifies a propagation flag that is policy-specific and not domain-specific and that indicates whether the security policy is to be propagated or isolated;

upon determining that the parent domain propagates the security policy on the basis of the propagation flag, identifying a child domain that includes a second secured computing system and that is associated with the parent domain in a hierarchical relationship specifying an inheritance rule that is domain-specific and not policy-specific and that indicates whether security policy propagation applies from the parent domain to the child domain, wherein the child domain is associated with a grandchild domain; and upon determining that the inheritance rule includes a first rule code indicating that security policy propagation applies from the parent domain to the child domain, applying the security policy to the child domain by operation of one or more computer processors;

wherein the security policy is not applied to the child domain and not applied to the grandchild domain if the inheritance rule includes a second rule code indicating that security policy propagation is stopped at the child domain;

wherein the security policy is not applied to the child domain but applied to the grandchild domain if the inheritance rule includes a third rule code indicating that security propagation is bypassed at the child domain;

wherein the security policy is managed based on at least one of: (i) a domain hierarchy specification including the hierarchical relationship; (ii) a domain policy assignment specification including the domain-specific inheritance rule; and (iii) a security policy propagation specification including the policy-specific propagation flag.

2. The method of claim 1, wherein the third rule code provides skipping inheritance of the security policy at the child domain while allowing the grandchild domain to specify whether to inherit the security policy.

3. The method of claim 1, wherein the security policy includes a natural language description for controlling access to the first secured computing system, and wherein the method further comprises:

determining that the security policy is applied to the child domain based on the domain hierarchy specification;

translating the security policy such that each of the first secured computing system and the second secured computing system enforce security policy.

4. The method of claim 1, further comprising:

identifying a plurality of child domains including the child domain;

determining whether each of the plurality of child domains inherits the security policy based on a plurality of inheritance rules respectively associated with the plurality of child domains; and if the respective child domain inherits the security policy, applying the security policy to the respective child domain.

5. The method of claim 1, further comprising:

applying a second security policy to the parent domain and to the child domain, respectively.

6. The method of claim 1, further comprising:

upon determining that the inheritance rule specifies that security policy propagation is bypassed at the child domain, applying the security policy to the grandchild domain.

7. The method of claim 6, wherein each of the domain hierarchy specification, the domain policy assignment specification, and the security policy propagation specification is stored in a respective table;

wherein the domain hierarchy table maps a domain identifier field to a domain parent field, an inheritance rule field, and a system identifiers field, wherein the inheritance rule field stores a rule code selected from a plurality of predefined rule codes including the first rule code, the second rule code, the third rule code, and a fourth rule code specifying that a domain designated by the domain identifier field is not presently associated with any parent domain;

wherein the domain policy assignment table maps a domain identifier field to a policy identifiers field;

wherein the security policy propagation table stores the propagation flag and maps a policy identifier field to a propagation flag.

8. A non-transitory computer-readable storage medium containing a program which, when executed, performs an operation to manage security policy propagation between a plurality of domains of secured computing systems and based on a policy-specific propagation flag and a domain-specific inheritance rule, the operation comprising:

applying a security policy to a parent domain that includes a first secured computing system, wherein the security policy specifies a propagation flag that is policy-specific and not domain-specific and that indicates whether the security policy is to be propagated or isolated;

upon determining that the parent domain propagates the security policy on the basis of the propagation flag, identifying a child domain that includes a second secured computing system and that is associated with the parent domain in a hierarchical relationship specifying an inheritance rule that is domain-specific and not policy-specific and that indicates whether security policy propagation applies from the parent domain to the child domain, wherein the child domain is associated with a grandchild domain; and upon determining that the inheritance rule includes a first rule code indicating that security policy propagation applies from the parent domain to the child domain, applying the security policy to the child domain by operation of one or more computer processors when executing the program;

wherein the security policy is not applied to the child domain and not applied to the grandchild domain if the inheritance rule includes a second rule code indicating that security policy propagation is stopped at the child domain;

wherein the security policy is not applied to the child domain but is applied to the grandchild domain if the inheritance rule includes a third rule code indicating that security propagation is bypassed at the child domain;

wherein the security policy is managed based on at least one of: (i) a domain hierarchy specification including the hierarchical relationship; (ii) a domain policy assignment specification including the domain-specific inheritance rule; and (iii) a security policy propagation specification including the policy-specific propagation flag.

9. The non-transitory computer-readable storage medium of claim 8, wherein the third rule code provides skipping inheritance of the security policy at the child domain while allowing the grandchild domain to specify whether to inherit the security policy.

10. The non-transitory computer-readable storage medium of claim 8, wherein the security policy includes a natural language description for controlling access to the first secured computing system, and wherein the operation further comprises:

determining that the security policy is applied to the child domain based on the domain hierarchy specification;

translating the security policy such that each of the first secured computing system and the second secured computing system enforce the security policy.

11. The non-transitory computer-readable storage medium of claim 8, wherein the operation further comprises:

identifying a plurality of child domains including the child domain;

determining whether each of the plurality of child domains inherits the security policy based on a plurality of inheritance rules respectively associated with the plurality of child domains; and if the respective child domain inherits the security policy, applying the security policy to the respective child domain.

12. The non-transitory computer-readable storage medium of claim 8, wherein the operation further comprises:

applying a second security policy to the parent domain and to the child domain, respectively.

13. The non-transitory computer-readable storage medium of claim 8, wherein the operation further comprises:

upon determining that the inheritance rule specifies that security policy propagation is bypassed at the child domain, applying the security policy to the grandchild domain.

14. The non-transitory computer-readable storage medium of claim 13, wherein each of the domain hierarchy specification, the domain policy assignment specification, and the security policy propagation specification is stored in a respective table;

wherein the domain hierarchy table maps a domain identifier field to a domain parent field, an inheritance rule field, and a system identifiers field, wherein the inheritance rule field stores a rule code selected from a plurality of predefined rule codes including the first rule code, the second rule code, the third rule code, and a fourth rule code specifying that a domain designated by the domain identifier field is not presently associated with any parent domain;

wherein the domain policy assignment table maps a domain identifier field to a policy identifiers field;

wherein the security policy propagation table stores the propagation flag and maps a policy identifier field to a propagation flag.

15. A system to manage security policy propagation between a plurality of domains of secured computing systems and based on a policy-specific propagation flag and a domain-specific inheritance rule, the system comprising:

a processor; and a memory containing a program which, when executed by the processor, performs an operation comprising:

applying a security policy to a parent domain that includes a first secured computing system, wherein the security policy specifies a propagation flag that is policy-specific and not domain-specific and that indicates whether the security policy is to be propagated or isolated;

upon determining that the parent domain propagates the security policy on the basis of the propagation flag, identifying a child domain that includes a second secured computing system and that is associated with the parent domain in a hierarchical relationship specifying an inheritance rule that is domain-specific and not policy-specific and that indicates whether security policy propagation applies from the parent domain to the child domain, wherein the child domain is associated with a grandchild domain; and upon determining that the inheritance rule includes a first rule code indicating that security policy propagation applies from the parent domain to the child domain, applying the security policy to the child domain;

wherein the security policy is not applied to the child domain and not applied to the grandchild domain if the inheritance rule includes a second rule code indicating that security policy propagation is stopped at the child domain;

wherein the security policy is not applied to the child domain but is applied to the grandchild domain if the inheritance rule includes a third rule code indicating that security propagation is bypassed at the child domain;

wherein the security policy is managed based on at least one of: (i) a domain hierarchy specification including the hierarchical relationship; (ii) a domain policy assignment specification including the domain-specific inheritance rule; and (iii) a security policy propagation specification including the policy-specific propagation flag.

16. The system of claim 15, wherein the third rule code provides skipping inheritance of the security policy at the child domain while allowing the grandchild domain to specify whether to inherit the security policy.

17. The system of claim 15, wherein the security policy includes a natural language description for controlling access to the first secured computing system, and wherein the operation further comprises:

determining that the security policy is applied to the child domain based on the domain hierarchy specification;

translating the security policy such that each of the first secured computing system and the second secured computing system enforce the security policy.

18. The system of claim 15, wherein the operation further comprises:

identifying a plurality of child domains including the child domain;

determining whether each of the plurality of child domains inherits the security policy based on a plurality of inheritance rules respectively associated with the plurality of child domains; and if the respective child domain inherits the security policy, applying the security policy to the respective child domain.

19. The system of claim 15, wherein the operation further comprises:

applying a second security policy to the parent domain and to the child domain, respectively.

20. The system of claim 15, wherein the operation further comprises:

upon determining that the inheritance rule specifies that security policy propagation is bypassed at the child domain, applying the security policy to the grandchild domain.

21. The system of claim 20, wherein each of the domain hierarchy specification, the domain policy assignment specification, and the security policy propagation specification is stored in a respective table;

wherein the domain hierarchy table maps a domain identifier field to a domain parent field, an inheritance rule field, and a system identifiers field, wherein the inheritance rule field stores a rule code selected from a plurality of predefined rule codes including the first rule code, the second rule code, the third rule code, and a fourth rule code specifying that a domain designated by the domain identifier field is not presently associated with any parent domain;

wherein the domain policy assignment table maps a domain identifier field to a policy identifiers field;

wherein the security policy propagation table stores the propagation flag and maps a policy identifier field to a propagation flag.

\* \* \* \* \*